United States Patent
Morin et al.

(10) Patent No.: US 11,615,444 B2
(45) Date of Patent: Mar. 28, 2023

(54) RECOMMENDING THAT AN ENTITY IN AN ONLINE SYSTEM CREATE CONTENT DESCRIBING AN ITEM ASSOCIATED WITH A TOPIC HAVING AT LEAST A THRESHOLD VALUE OF A PERFORMANCE METRIC AND TO ADD A TAG DESCRIBING THE ITEM TO THE CONTENT

(71) Applicant: Meta Platforms, Inc., Menlo Park, CA (US)

(72) Inventors: Steve Morin, San Francisco, CA (US); Xuewei Ouyang, San Francisco, CA (US); Martin Mroz, San Francisco, CA (US); Anuj Madan, San Mateo, CA (US)

(73) Assignee: Meta Platforms, Inc., Menlo Park, CA (US)

(*) Notice: Subject to any disclaimer, the term of this patent is extended or adjusted under 35 U.S.C. 154(b) by 0 days.

(21) Appl. No.: 16/864,705

(22) Filed: May 1, 2020

(65) Prior Publication Data
US 2021/0342927 A1 Nov. 4, 2021

(51) Int. Cl.
*G06Q 30/00* (2012.01)
*G06Q 30/0241* (2023.01)
(Continued)

(52) U.S. Cl.
CPC ......... *G06Q 30/0276* (2013.01); *G06F 17/18* (2013.01); *G06N 20/00* (2019.01);
(Continued)

(58) Field of Classification Search
CPC .......... G06Q 30/02–0277; G06Q 50/01; G06F 17/18; G06N 20/00
See application file for complete search history.

(56) References Cited

U.S. PATENT DOCUMENTS

| | | | |
|---|---|---|---|
| 2011/0167486 A1* | 7/2011 | Ayloo | G06Q 30/0261 726/7 |
| 2015/0012350 A1* | 1/2015 | Li | G06Q 10/06395 705/14.42 |

(Continued)

FOREIGN PATENT DOCUMENTS

WO WO-2006003585 A1 * 1/2006 ............... H04N 5/76

OTHER PUBLICATIONS

Coffey, "Internet Audience Measurement: A Practitioner's View," Journal of Interactive Advertising, vol. 1, No. 2, Spring 2001, 8 pages. (Year: 2001).*

*Primary Examiner* — Raquel Alvarez
(74) *Attorney, Agent, or Firm* — Fenwick & West LLP

(57) ABSTRACT

An online system accesses a model trained based on a topic associated with a set of content items and the content of the set of content items. The online system applies the model to predict a probability that each of multiple content items is associated with the topic based on its content and identifies (a) content item(s) associated with at least a threshold probability. The online system retrieves information describing user engagement with the identified content item(s) and determines a value of a performance metric for the topic based on this information. If the value is at least a threshold value and the online system receives content from an entity describing an item associated with the topic, the online system communicates a recommendation to the entity to create a content item describing the item and to add a tag associated with the item upon determining an opportunity to do so.

18 Claims, 3 Drawing Sheets

(51) Int. Cl.
*G06N 20/00* (2019.01)
*G06F 17/18* (2006.01)
*G06Q 30/0201* (2023.01)
*G06Q 30/0251* (2023.01)
*G06Q 50/00* (2012.01)

(52) U.S. Cl.
CPC ..... *G06Q 30/0201* (2013.01); *G06Q 30/0254* (2013.01); *G06Q 50/01* (2013.01)

(56) References Cited

U.S. PATENT DOCUMENTS

| | | | |
|---|---|---|---|
| 2015/0026084 A1* | 1/2015 | Guo | H04N 1/00244 |
| | | | 705/319 |
| 2015/0067048 A1* | 3/2015 | Kannan | G06Q 30/0241 |
| | | | 709/204 |
| 2015/0081725 A1* | 3/2015 | Ogawa | H04L 67/22 |
| | | | 707/754 |
| 2016/0092576 A1* | 3/2016 | Quercia | G06Q 30/0631 |
| | | | 707/734 |
| 2016/0300262 A1* | 10/2016 | Gao | G06Q 50/01 |
| 2019/0034976 A1* | 1/2019 | Hamedi | G06Q 30/0243 |
| 2019/0172075 A1* | 6/2019 | Kenkre | G06Q 30/0201 |
| 2019/0205473 A1* | 7/2019 | Socol | G06F 16/248 |
| 2019/0207894 A1* | 7/2019 | Kumar | H04W 4/18 |
| 2020/0210647 A1* | 7/2020 | Panuganty | G06N 20/10 |

\* cited by examiner

RECOMMENDING THAT AN ENTITY IN AN ONLINE SYSTEM CREATE CONTENT DESCRIBING AN ITEM ASSOCIATED WITH A TOPIC HAVING AT LEAST A THRESHOLD VALUE OF A PERFORMANCE METRIC AND TO ADD A TAG DESCRIBING THE ITEM TO THE CONTENT

TECHNICAL FIELD

This disclosure relates generally to online systems, and more specifically to recommending that an entity in an online system create content describing an item associated with a topic having at least a threshold value of a performance metric and to add a tag describing the item to the content.

BACKGROUND

An online system allows its users to connect and communicate with other online system users. Users create profiles in the online system that are tied to their identities and include information about the users, such as interests and demographic information. The users may be individuals or entities such as corporations or charities. Because of the popularity of online systems and the significant amount of user-specific information maintained in online systems, an online system provides an ideal forum for allowing users to share content by creating content items for presentation to additional online system users. For example, users may share photos or videos they have uploaded by creating content items that include the photos or videos that are presented to additional users to whom they are connected in the online system.

To facilitate the distribution of content, online systems conventionally allow their users to add tags to content items, which help other online system users search for the content items. When creating content items, online system users may add tags that highlight keywords or topics that may be associated with content included in the content items. A tag may consist of a hashtag (#) followed by text, such as a keyword, a phrase, a category, a topic, etc. or an emoji and may be added to a portion of a content item (e.g., in a caption, in a comment on the content item, etc.). For example, when creating a content item that includes a photo of a flower, an online system user may add tags to the content item by including "#flower" and "#photo" in a caption. In this example, once the content item is created, the content item may be included among content items returned in a search result when other online system users search for content items including one or more of the tags. Since tags offer a convenient way for online system users to search for currently popular or "trending" topics, users who create content items may be more inclined to create content items associated with trending topics and to add tags corresponding to trending topics to their content items.

However, online system users who potentially may create content items that are associated with trending topics may be unaware that the topics are trending and may forego creating the content items or may create the content items, but forego adding tags corresponding to the trending topics. For example, suppose that the topic of leather jackets is currently trending and that the majority of online system users searching for content items associated with the topic are searching for content items including the tag "#leatherjacket." In this example suppose also that an entity having a presence in an online system previously provided a product catalog to the online system and that leather jackets are included among the products included in the product catalog. In the above example, although the entity may create one or more content items associated with the trending topic, the entity may not do so if it is unaware that the topic is trending. Furthermore, in the above example, even if the entity creates a content item associated with the trending topic, online system users may not discover the content item if the content item does not include the tag "#leatherjacket" (e.g., if the tag is misspelled) or if the content item includes a different tag or a combination of tags that online system users do not often use to search for content.

SUMMARY

To facilitate the distribution of content, online systems conventionally allow their users to add tags to content items when creating the content items, which help other online system users search for the content items. Since tags offer a convenient way for online system users to search for trending topics, users who create content items may be more inclined to create content items associated with trending topics and to add tags corresponding to trending topics to their content items. However, online system users who potentially may create content items that are associated with trending topics may be unaware that the topics are trending and may forego creating the content items or may create the content items, but forego adding tags corresponding to the trending topics.

To encourage online system users to create content items that are associated with trending topics and to add tags corresponding to the trending topics to the content items, an online system recommends that an entity in the online system create a content item describing an item associated with a topic having at least a threshold value of a performance metric and to add a tag describing the item to the content item. More specifically, the online system retrieves multiple content items maintained in the online system and accesses a machine-learning model trained based on a topic associated with a set of content items and the content of the set of content items. The online system applies the model to predict a probability that each of the retrieved content items is associated with the topic based on its content and identifies one or more content items associated with at least a threshold probability. The online system retrieves information describing user engagement with the identified content items(s) and determines a value of a performance metric for the topic based on this information. If the online system determines that the value is at least a threshold value and receives content describing an item associated with the topic from an entity having a presence on the online system, the online system determines an opportunity to communicate a recommendation to the entity to create a content item describing the item and to add a tag associated with the item to the content item. The online system then communicates the recommendation to the entity.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
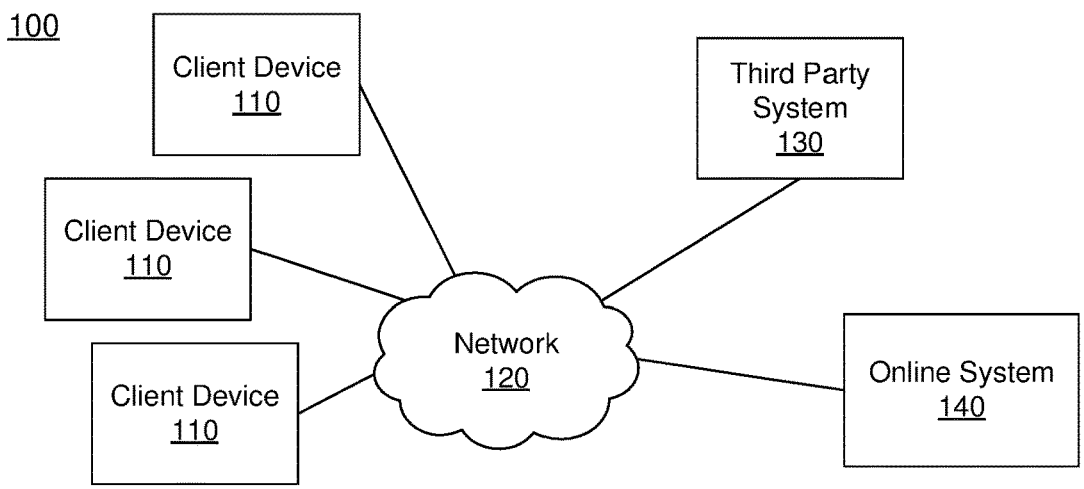
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device 110. In other embodiments, a third-party system 130 (e.g., a content publisher) provides content or other information for presentation via a client device 110. A third-party system 130 also may communicate information to the online system 140, such as advertisements, content, or information about an application provided by the third-party system 130.

Figure 2:
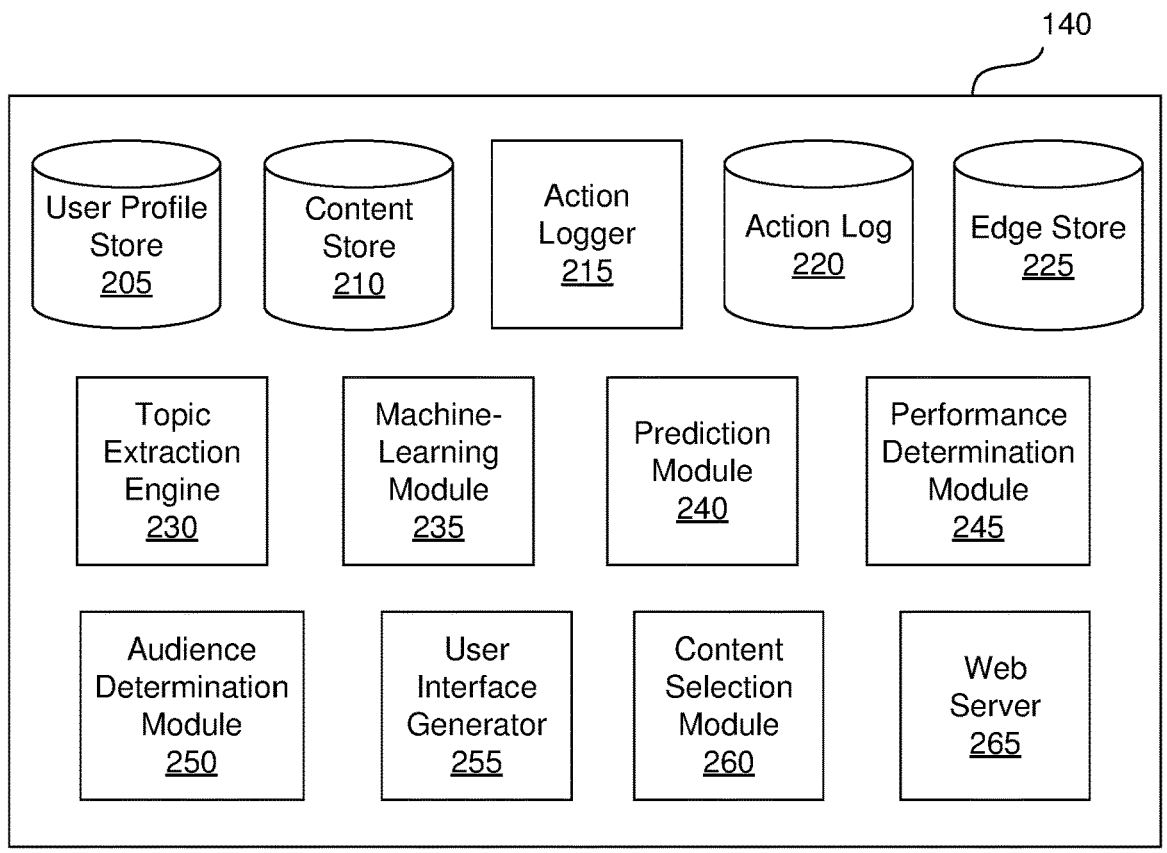
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a topic extraction engine 230, a machine-learning module 235, a prediction module 240, a performance determination module 245, an audience determination module 250, a user interface generator 255, a content selection module 260, and a web server 265. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and also may include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image, with information identifying the images in which a user is tagged stored in the user profile of the user. A user profile in the user profile store 205 also may maintain references to actions by the corresponding user performed on content items in the content store 210 and stored in the action log 220.

While user profiles in the user profile store 205 frequently are associated with individuals, allowing individuals to interact with each other via the online system 140, user profiles also may be stored for entities such as businesses or organizations. This allows an entity to establish a presence in the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., a brand page), an advertisement, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions in the online system 140, as well as actions in third-party systems 130 that communicate information to the online system 140. Users may interact with various objects in the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects in the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 140 as well as with other applications operating in the online system 140. In some embodiments, data from the action log 220 is used to infer interests or preferences of a user, augmenting the interests included in the user's user profile and allowing a more complete understanding of user preferences.

The action log 220 also may store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 for storing in the action log 220 by the application for recordation and association with the user by the online system 140.

In one embodiment, the edge store 225 stores information describing connections between users and other objects in the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page in the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe the rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The online system 140 includes a topic extraction engine 230, which identifies one or more topics associated with objects in the content store 210. To identify topics associated with content items, the topic extraction engine 230 identifies anchor terms included in a content item and determines meanings of the anchor terms as further described in U.S. patent application Ser. No. 13/167,701 (U.S. Pat. No. 9,779,385, issued on Oct. 3, 2017), filed on Jun. 24, 2011, which is hereby incorporated by reference in its entirety. For example, the topic extraction engine 230 determines one or more topics associated with a content item maintained in the content store 210. One or more topics associated with a content item are stored and associated with an object identifier corresponding to the content item. In various embodiments, associations between object identifiers and topics are stored in the topic extraction engine 230 or in the content store 210 to simplify retrieval of one or more topics associated with an object identifier or retrieval of object identifiers associated with a specified topic. Structured information associated with a content item also may be used to extract a topic associated with the content item. The functionality of the topic extraction engine 230 is further described below in conjunction with FIG. 3.

The machine-learning module 235 may train a machine-learning model to predict a probability that a content item is associated with a topic. Examples of topics with which content items may be associated include people (e.g., private individuals, public figures, or groups), political issues or movements, organizations, specific items (e.g., specific products), categories of products or services, book genres, cuisines, diets, etc. The machine-learning model may be a convolutional neural network, a deep learning model, or any other suitable machine-learning model. In some embodiments, the machine-learning module 235 may train multiple machine-learning models that collectively predict a probability that a content item is associated with a topic. The machine-learning module 235 may train the machine-learning model based on one or more topics associated with a training set of content items and content included in each of the training set of content items. Content included in a content item that may be used to train the machine-learning model may include various types of structured and/or unstructured data, such as text data, image data, video data, audio data, or any other suitable types of data that may be included in the content item.

The machine-learning module 235 may train the machine-learning model using various techniques. In embodiments in which content used to train the machine-learning model includes text data (e.g., text included in a caption, a comment, a tag, metadata, or a location associated with the content item), the machine-learning module 235 may train the machine-learning model using one or more natural language processing techniques, such as a topic modeling algorithm and/or a word embedding algorithm (e.g., Latent Semantic Analysis (LSA), Probabilistic Latent Semantic Analysis (PLSA), Latent Dirichlet Allocation (LDA), Word2Vec, LDA2Vec, etc.). In embodiments in which content used to train the machine-learning model includes audio data, the machine-learning module 235 may pre-process the audio data, such as by removing noise, transcribing speech into text (e.g., manually or using audio transcription technology (e.g., Automatic Speech Recognition (ASR)), etc.). The machine-learning module 235 also may train the machine-learning model using one or more algorithms that classify audio data (e.g., into different types of noises, different genres of music, etc.). Furthermore, in embodiments in which audio data used to train the machine-learning model includes speech that is transcribed into text, the text may be used to train the machine-learning model using one or more natural language processing techniques, as described above. In embodiments in which content used to train the machine-learning model includes image data and/or video data, the machine-learning module 235 may train the machine-learning model using one or more image processing techniques, as described below.

In embodiments in which content used to train the machine-learning model includes image data and/or video data, once trained, the machine-learning model may first detect one or more objects included in a content item and then predict a probability that each object is associated with a topic. The machine-learning model may detect one or more objects within an image included in a content item (or within an image included in one or more frames of a video included in the content item) by applying one or more object detection methods to the image. The machine-learning model also may identify locations of objects detected within an image (e.g., by generating a bounding box surrounding each object). In various embodiments, the machine-learning model uses one or more object detection methods to identify a category or a type corresponding to each object detected within an image. For example, using an object detection method, the machine-learning model associates different categories or types (e.g., types of products or other items) with objects detected within an image based on attributes of the objects. The machine-learning model then makes one or more predictions that each correspond to a probability that an object detected within an image is associated with a topic (e.g., a category or a type that the machine-learning model has associated with the object) and outputs the probability/probabilities. In various embodiments, the machine-learning model may make a prediction that an object detected within an image corresponds to a specific item (e.g., a product), in which the item corresponds to a topic. In such embodiments, the machine-learning model may compare the object to images of items (e.g., images of products included in a product catalog) and make one or more predictions that each correspond to a probability that an object detected within the image is associated with the topic based on the comparison.

In embodiments in which the machine-learning model predicts a probability that an object detected within an image included in a content item is associated with a topic, the machine-learning module 235 may train the machine-learning model based on a training set of images including images of different objects associated with different topics. In some embodiments, the training set of images may include publicly available information identifying different topics associated with different objects. The machine-learning model also may be trained based on attributes that characterize each of the training set of images (e.g., shapes, edges, curves, etc.) as well as information identifying topics associated with each of the training set of images.

In embodiments in which the machine-learning model predicts a probability that an object detected within an image corresponds to a specific item, the machine-learning module 235 may train the machine-learning model based on comparisons of objects detected within images to images of items. In some embodiments, the machine-learning module 235 trains the machine-learning model to predict a probability that an object detected within an image matches an item based on prior matching of objects detected within images to different items (e.g., images of different products included in one or more product catalogs). For example, the machine-learning module 235 applies a label to an object detected within an image indicating that the object matches an item (e.g., a product) based on attributes of the object (e.g., logos, trademarks, emblems, icons, patterns, textures, prints, etc.). From the labeled attributes of objects extracted from images, the machine-learning module 235 trains the machine-learning model using any suitable training method or combination of training methods (e.g., back propagation if the machine-learning model is a neural network, curve fitting techniques if the machine-learning model is a linear regression model, etc.). The functionality of the machine-learning module 235 is further described below in conjunction with FIG. 3.

The prediction module 240 retrieves (e.g., as shown in step 305 of FIG. 3) content items maintained in the online system 140 (e.g., from the content store 210). For example, the prediction module 240 accesses the content store 210 and retrieves various content items created by one or more users of the online system 140. In some embodiments, the prediction module 240 may retrieve content items based on a set of criteria (e.g., based on the creators of the content items, based on when the content items were created, based on geographic locations associated with the content items, etc.). For example, the prediction module 240 may only retrieve content items that were created by non-merchant users of the online system 140 within the past month. Alternatively, in the above example, the prediction module 240 may only retrieve content items that were created by merchant users of the online system 140 within the past month.

The prediction module 240 also accesses (e.g., as shown in step 310 of FIG. 3) a trained machine-learning model and applies (e.g., as shown in step 315 of FIG. 3) the machine-learning model to predict a probability that a content item is associated with a topic. In some embodiments, the machine-learning model may be trained by the machine-learning module 235, while in other embodiments, the machine-learning model may be trained by a third-party system 130. To use the machine-learning model to predict a probability that a content item is associated with a topic, the prediction module 240 provides an input to the machine-learning model that includes the content of the content item. As described above, the content of a content item may include various types of structured and/or unstructured data (e.g., text data, image data, video data, audio data, etc.) included in one or more components of the content item (e.g., a caption, one or more images, one or more videos, one or more tags, a set of targeting criteria specifying an audience for the content item, a location, one or more audio files, etc.). Based on the content of the content item, the machine-learning model predicts a probability that the content item is associated with a topic. The prediction module 240 then receives an output from the machine-learning model corresponding to the predicted probability. In some embodiments, the prediction module 240 may access and apply multiple machine-learning models that collectively perform the function of the machine-learning model. The functionality of the prediction module 240 is further described below in conjunction with FIG. 3.

The performance determination module 245 identifies (e.g., as shown in step 320 of FIG. 3) one or more content items, each of which is associated with a probability predicted by the machine-learning model that is at least a threshold probability. In some embodiments, the performance determination module 245 may do so by comparing a predicted probability associated with a content item to the threshold probability and then determining whether the predicted probability is at least the threshold probability based on the comparison. For example, suppose that the prediction module 240 has applied a machine-learning model to predict probabilities that multiple content items are associated with a topic. In this example, the performance determination module 245 may compare a probability associated with each content item predicted by the machine-learning model to a threshold probability. In this example, if the probability is at least the threshold probability, the content item is identified by the performance determination module 245. In the above example, if the probability is less than the threshold probability, the content item is not identified by the performance determination module 245.

The performance determination module 245 also retrieves (e.g., as shown in step 325 of FIG. 3) information describing user engagement with one or more content items. Examples of types of user engagement with a content item may include viewing the content item, sharing the content item, saving the content item, expressing a preference for the content item, commenting on the content item, reporting the content item as inappropriate, interacting with the content item to unsubscribe to content created by an online system user who created the content item, etc. The performance determination module 245 may retrieve information describing user engagement with content items from the action log 220 and/or the edge store 225. For example, the performance determination module 245 may retrieve information from the action log 220 and/or the edge store 225 describing a number of times that a content item was viewed, a number of times that the content item was shared, a number of times that the content item was saved, a number of times that one or more users of the online system 140 expressed a preference for the content item, a number of comments on the content item, a time at which each user engaged with the content item, etc. Alternatively, in the above example, the performance determination module 245 may retrieve information from the action log 220 and/or the edge store 225 describing each instance that a type of user engagement with the content item occurred, which may then be tabulated to determine a number of times that the type of user engagement with the content item occurred.

In some embodiments, information describing user engagement with a content item retrieved by the performance determination module 245 also may include various types of information associated with each online system user who engaged with the content item. For example, the performance determination module 245 may retrieve information identifying each user who engaged with a content item, information describing a type of client device 110 associated with the user, etc. In embodiments in which the performance determination module 245 retrieves information identifying each user who engaged with a content item, the performance determination module 245 may communicate this information to the audience determination module 250. In some embodiments, the performance determination module 245 may do so if the performance determination module 245 determines that a value of a performance metric for a topic associated with the content item is at least a threshold value, as further described below. Alternatively, in some embodiments, the performance determination module 245 may communicate information identifying each user who engaged with a content item to the audience determination module 250 if the performance determination module 245 determines that a value of a performance metric for a topic associated with the content item is an anomaly (e.g., for a current time period), as further described below.

The performance determination module 245 also determines (e.g., as shown in step 330 of FIG. 3) a value of a performance metric for a topic based on information retrieved by the performance determination module 245 describing user engagement with one or more content items associated with the topic (e.g., content items associated with probabilities predicted by a machine-learning model that are at least a threshold probability). Examples of performance metrics include a click-through-rate (CTR), a conversion rate, or any other suitable type of performance metric describing user engagement with one or more content items.

In embodiments in which the performance determination module 245 determines a value of a performance metric for a topic based on information describing user engagement with multiple content items associated with the topic, the performance determination module 245 may determine a value of a performance metric for each content item and determine the value of the performance metric for the topic based on the values of the performance metrics for all of the content items. For example, the performance determination module 245 may determine a value of a click-through-rate for a topic to be an average of the click-through-rates for multiple content items associated with the topic.

Once the performance determination module 245 has determined a value of a performance metric for a topic, the performance determination module 245 may determine whether the value is at least a threshold value. The performance determination module 245 may do so by comparing the value of the performance metric for the topic to the threshold value and then determining whether the value of the performance metric for the topic is at least the threshold value based on the comparison. For example, suppose that the performance determination module 245 has determined a value of a performance metric for a topic to be 3.5%, in which the value of the performance metric corresponds to an average of the landing page conversion rates for multiple content items associated with the topic. In this example, if the threshold value corresponds to a value of 3.2%, the performance determination module 245 determines 335 that the value of the performance metric for the topic is at least the threshold value since 3.5% is equal to or greater than 3.2%.

In some embodiments, the performance determination module 245 may determine whether a value of a performance metric for a topic is an anomaly. In such embodiments, the performance determination module 245 may make the determination for a particular time period (e.g., a current time period). For example, the performance determination module 245 may compare the value of a performance metric for a topic for a current time period to values of the performance metric for the topic for previous time periods. In this example, the performance determination module 245 may determine that the value of the performance metric for the topic for the current time period is an anomaly if the value is greater than the values of the performance metric for the topic for the previous time periods by at least a threshold amount. Alternatively, in the above example, the performance determination module 245 may determine that the value of the performance metric for the topic for the current time period is not an anomaly if the value is not greater than the values of the performance metric for the topic for the previous time periods by at least the threshold amount. The performance determination module 245 may determine whether a value of a performance metric for a topic is an anomaly using any anomaly detection technique (e.g., density-based techniques such as k-nearest neighbor, one-class support vector machines, etc.). The functionality of the performance determination module 245 is further described below in conjunction with FIG. 3.

The audience determination module 250 may determine a set of targeting criteria associated with a topic. To do so, the audience determination module 250 may receive information identifying each online system user who engaged with a content item associated with the topic (e.g., from the performance determination module 245). The audience determination module 250 may then retrieve various attributes associated with each user (e.g., from the user profile store 205, the action log 220, and/or the edge store 225) and determine a set of targeting criteria associated with the topic based on the retrieved information. For example, based on a username associated with each online system user who engaged with a content item associated with a topic, the audience determination module 250 may retrieve information from the user profile store 205 describing demographic information associated with each user (e.g., an age and a geographic location associated with each user), information describing hobbies and occupations of each user, etc. In this example, the audience determination module 250 also may retrieve information from the action log 220 and/or the edge store 225 describing interactions by each user (e.g., with other users of the online system 140 or objects maintained in the online system 140). In the above example, based on the retrieved information, the audience determination module 250 may determine a set of targeting criteria associated with the topic, in which the targeting criteria are satisfied by users of the online system 140 who are likely to have an affinity for the topic. The functionality of the audience determination module 250 is further described below in conjunction with FIG. 3.

The user interface generator 255 generates a recommendation to create a content item. In some embodiments, the recommendation may correspond to a recommendation to create a content item describing an item. Furthermore, in such embodiments, the item may be associated with a topic. In some embodiments, the recommendation may be included in a composer interface generated by the user interface generator 255. In other embodiments, the recommendation may be included in a window (e.g., a pop-up window) or any other suitable user interface generated by the user interface generator 255. The composer interface or other user interface including the recommendation may be communicated to a user of the online system 140 or other entity having a presence on the online system 140 via a client device 110 associated with the user/entity.

The recommendation generated by the user interface generator 255 also or alternatively may include one or more options to add various components to a content item. Examples of components that may be added to a content item include one or more tags, a caption, one or more videos, one or more images, a set of targeting criteria specifying an audience for the content item, a location, one or more audio files, or any other suitable types of components. In embodiments in which the recommendation includes one or more options to add various components to a content item, the recommendation also may include pre-populated information corresponding to the components. For example, if the recommendation includes an option to add one or more tags to a content item, the recommendation may include a tag associated with an object or a topic, such as a tag that is pre-populated with information describing a product corresponding to the object or information describing a category of product corresponding to the topic. In the above example, if the recommendation also includes an option to add one or more images to the content item, the recommendation may be pre-populated with one or more images of the product included in a catalog of products.

In embodiments in which the recommendation includes pre-populated information corresponding to one or more components of a content item, the pre-populated information may be accepted or rejected. For example, suppose that the online system 140 has communicated a recommendation to an entity to create a content item and to add a tag and an image to the content item, in which the recommendation includes pre-populated information corresponding to the tag and the image. In this example, the entity may accept the pre-populated information by communicating a request to the online system 140 to create the content item, in which the request includes the pre-populated information. In this example, the online system 140 may then create the content item based on the request. Alternatively, in the above example, the entity may reject the pre-populated information corresponding to one or more of the components (e.g., by unselecting or deleting the tag and/or image). In this example, the entity may communicate a request to the online system 140 to create the content item, in which the request no longer includes the pre-populated information that was rejected by the entity. In this example, the online system 140 may then create the content item based on the request.

The user interface generator 255 may generate a user interface including one or more values of one or more performance metrics for one or more topics. The user interface may correspond to a window (e.g., a pop-up window) that may be communicated in conjunction with a recommendation generated by the user interface generator 255. In embodiments in which the user interface generator 255 generates a composer interface including a recommendation, the value(s) of the performance metric(s) for the topic(s) may be included in the composer interface as well. A value of a performance metric for a topic may be expressed in various ways (e.g., via text, graphically, etc.). For example, suppose that a value of a performance metric for a topic corresponds to a conversion rate for tennis-related content and that an additional value of a performance metric for the topic corresponds to a click-through-rate for tennis-related content. In this example, the user interface generator 255 may generate a composer interface or a separate window that includes multiple graphs indicating conversion rates and click-through rates for tennis-related content by users of the online system 140 who were presented with content items associated with the topic of tennis. In some embodiments, the user interface/composer interface generated by the user interface generator 255 may include one or more interactive elements (e.g., drop-down menus, buttons, etc.). In the above example, interactive elements included in the composer interface/window may allow a user of the online system 140 or other entity presented with the graphs to view graphs corresponding to the values of the performance metrics for different periods of time, for different geographic locations, etc.

In some embodiments, the user interface generator 255 also may generate a content item based on a request received from a user of the online system 140 or any other entity having a presence on the online system 140. The request may be received via a user interface (e.g., a composer interface) and may include one or more components specified in the request. Components of a content item may include a caption, one or more images, one or more videos, one or more tags, a set of targeting criteria specifying an audience for the content item, a location, one or more audio files, or any other suitable types of components. In some embodiments, the user interface generator 255 may generate a content item to include pre-populated information corresponding to one or more components of the content item that have been accepted by an online system user or other entity requesting to create the content item. In various embodiments, the user interface generator 255 also or alternatively may generate a content item to include information corresponding to one or more components of the content item that have been provided by an online system user or other entity requesting to create the content item. The functionality of the user interface generator 255 is further described below in conjunction with FIGS. 3 and 4.

The content selection module 260 may identify one or more candidate content items eligible for presentation to a viewing user of the online system 140. Candidate content items eligible for presentation to the viewing user are retrieved from the content store 210 or from another source by the content selection module 260, which may rank the candidate content items and select one or more of the candidate content items for presentation to the viewing user. A candidate content item eligible for presentation to a viewing user is a content item associated with at least a threshold number of targeting criteria satisfied by characteristics of the viewing user or is a content item that is not associated with targeting criteria. In various embodiments, the content selection module 260 includes candidate content items eligible for presentation to a viewing user in one or more content selection processes, which identify a set of content items for presentation to the viewing user. For example, the content selection module 260 determines measures of relevance of various candidate content items to a viewing user based on characteristics associated with the viewing user by the online system 140 and based on the viewing user's affinity for different candidate content items. Based on the measures of relevance, the content selection module 260 selects content items for presentation to the viewing user. As an additional example, the content selection module 260 selects content items having the highest measures of relevance or having at least a threshold measure of relevance for presentation to a viewing user. Alternatively, the content selection module 260 ranks candidate content items based on their associated measures of relevance and selects content items having the highest positions in the ranking or having at least a threshold position in the ranking for presentation to a viewing user.

Content items selected for presentation to a viewing user may be associated with bid amounts. The content selection module 260 may use the bid amounts associated with candidate content items when selecting content for presentation to the viewing user. In various embodiments, the content selection module 260 determines an expected value associated with various candidate content items based on their bid amounts and selects content items associated with a maximum expected value or associated with at least a threshold expected value for presentation to a viewing user. An expected value associated with a candidate content item represents an expected amount of compensation to the online system 140 for presenting the candidate content item. For example, the expected value associated with a candidate content item is a product of the candidate content item's bid amount and a likelihood of a viewing user interacting with content from the candidate content item. The content selection module 260 may rank candidate content items based on their associated bid amounts and select content items having at least a threshold position in the ranking for presentation to a viewing user. In some embodiments, the content selection module 260 ranks both candidate content items not associated with bid amounts and candidate content items associated with bid amounts in a unified ranking based on bid amounts and measures of relevance associated with the candidate content items. Based on the unified ranking, the content selection module 260 selects content for presentation to the viewing user. Selecting content items through a unified ranking is further described in U.S. patent application Ser. No. 13/545,266, filed on Jul. 10, 2012, which is hereby incorporated by reference in its entirety.

For example, the content selection module 260 receives a request to present a feed of content to a viewing user of the online system 140. The feed may include one or more advertisements as well as other content items, such as stories describing actions associated with other online system users connected to the viewing user. The content selection module 260 accesses one or more of the user profile store 205, the content store 210, the action log 220, and the edge store 225 to retrieve information about the viewing user. For example, stories or other data associated with users connected to the viewing user are retrieved. The retrieved stories or other content items are analyzed by the content selection module 260 to identify candidate content that is likely to be relevant to the viewing user. For example, stories associated with users not connected to the viewing user or stories associated with users for which the viewing user has less than a threshold affinity are discarded as candidate content. Based on various criteria, the content selection module 260 selects one or more of the content items identified as candidate content for presentation to the viewing user. The selected content items may be included in a feed of content that is presented to the viewing user. For example, the feed of content includes at least a threshold number of content items describing actions associated with users connected to the viewing user via the online system 140.

In various embodiments, the content selection module 260 presents content to a viewing user through a newsfeed including a plurality of content items selected for presentation to the viewing user. One or more advertisements also may be included in the feed. The content selection module 260 may also determine the order in which selected content items are presented via the feed. For example, the content selection module 260 orders content items in a feed based on likelihoods of a viewing user interacting with various content items. The functionality of the content selection module 260 is further described below in conjunction with FIG. 3.

The web server 265 links the online system 140 via the network 120 to the one or more client devices 110, as well as to the one or more third-party systems 130. The web server 265 serves web pages, as well as other content, such as JAVA®, FLASH®, XML and so forth. The web server 265 may receive and route messages between the online system 140 and the client device 110, for example, instant messages, queued messages (e.g., email), text messages, short message service (SMS) messages, or messages sent using any other suitable messaging technique. A user may send a request to the web server 265 to upload information (e.g., images or videos) that are stored in the content store 210. Additionally, the web server 265 may provide application programming interface (API) functionality to send data directly to native client device operating systems, such as IOS®, ANDROID™, WEBOS® or BlackberryOS.

Figure 3:
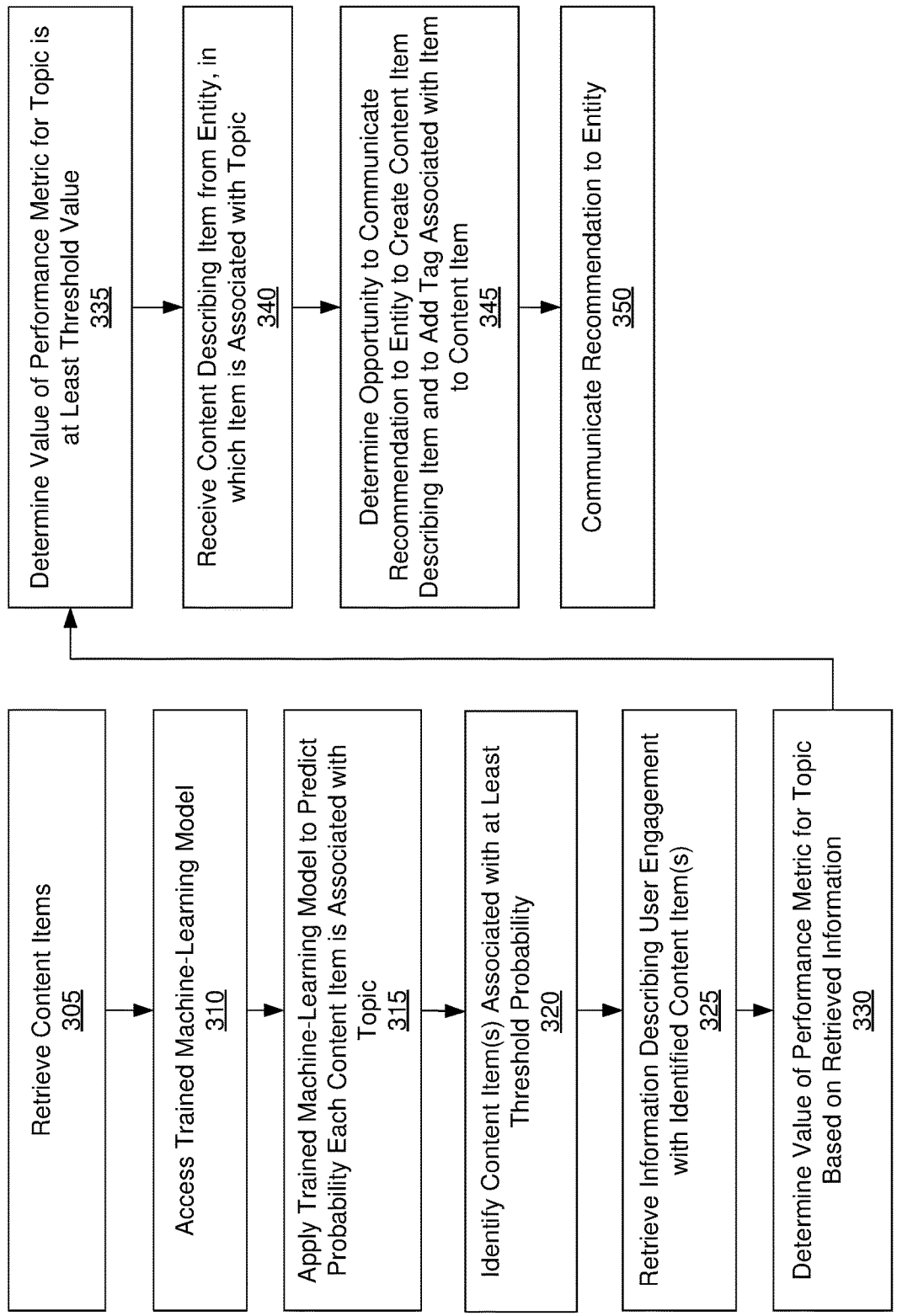
FIG. 3 is a flow chart of a method for recommending that an entity in an online system create content describing an item associated with a topic having at least a threshold value of a performance metric and to add a tag describing the item to the content, in accordance with an embodiment.

Recommending that an Entity in an Online System Create Content Describing an Item Associated with a Topic Having at Least a Threshold Value of a Performance Metric and to Add a Tag Describing the Item to the Content FIG. 3 is a flow chart of a method for recommending that an entity in an online system create content describing an item associated with a topic having at least a threshold value of a performance metric and to add a tag describing the item to the content. In other embodiments, the method may include different and/or additional steps than those shown in FIG. 3. Additionally, steps of the method may be performed in a different order than the order described in conjunction with FIG. 3.

The online system 140 retrieves 305 (e.g., using the prediction module 240) multiple content items maintained in the online system 140 (e.g., from the content store 210). For example, the online system 140 accesses the content store 210 and retrieves 305 various content items created by one or more users of the online system 140. In some embodiments, the online system 140 may retrieve (in step 305) content items based on a set of criteria (e.g., based on the creators of the content items, based on when the content items were created, based on geographic locations associated with the content items, etc.). For example, the online system 140 may only retrieve (in step 305) content items that were created by non-merchant users of the online system 140 within the past month. Alternatively, in the above example, the online system 140 may only retrieve (in step 305) content items that were created by merchant users of the online system 140 within the past month.

The online system 140 then accesses 310 (e.g., using the prediction module 240) a trained machine-learning model (e.g., a machine-learning model trained by the machine-learning module 235 or by a third-party system 130) that is trained to predict a probability that a content item is associated with a topic. Examples of topics with which a content item may be associated include people (e.g., private individuals, public figures, or groups), political issues or movements, organizations, specific items (e.g., specific products), categories of products or services, book genres, cuisines, diets, etc. As described above, the machine-learning model may be a convolutional neural network, a deep learning model, or any other suitable machine-learning model. In some embodiments, the online system 140 may access multiple machine-learning models that collectively perform the function of the machine-learning model.

The machine-learning model may be trained based on one or more topics associated with a training set of content items and content included in each of the training set of content items. Content included in a content item that may be used to train the machine-learning model may include various types of structured and/or unstructured data, such as text data, image data, video data, audio data, or any other suitable types of data that may be included in the content item. As described above, the machine-learning model may be trained using various techniques. In embodiments in which content used to train the machine-learning model includes text data (e.g., text included in a caption, a comment, a tag, metadata, or a location associated with the content item), the machine-learning model may be trained using one or more natural language processing techniques, such as a topic modeling algorithm and/or a word embedding algorithm (e.g., Latent Semantic Analysis (LSA), Probabilistic Latent Semantic Analysis (PLSA), Latent Dirichlet Allocation (LDA), Word2Vec, LDA2Vec, etc.). In embodiments in which content used to train the machine-learning model includes audio data, the audio data may be pre-processed (e.g., by removing noise, transcribing speech into text, etc.). The machine-learning model also may be trained using one or more algorithms that classify audio data (e.g., into different types of noises, different genres of music, etc.). Furthermore, in embodiments in which audio data used to train the machine-learning model includes speech that is transcribed into text, the text may be used to train the machine-learning model using one or more natural language processing techniques, as described above. In embodiments in which content used to train the machine-learning model includes image data and/or video data, the machine-learning model may be trained using one or more image processing techniques, as described below.

In embodiments in which content used to train the machine-learning model includes image data and/or video data, the machine-learning model may first detect one or more objects included in each content item retrieved 305 by the online system 140 and then predict a probability that each object is associated with the topic. The machine-learning model may detect one or more objects within an image included in a content item (or within an image included in one or more frames of a video included in the content item) by applying one or more object detection methods to the image. The machine-learning model also may identify locations of objects detected within an image (e.g., by generating a bounding box surrounding each object). In various embodiments, the machine-learning model uses one or more object detection methods to identify a category or a type corresponding to each object detected within an image. For example, using an object detection method, the machine-learning model associates different categories or types (e.g., types of products or other items) with objects detected within an image based on attributes of the objects. The machine-learning model then makes one or more predictions that each correspond to a probability that an object detected within an image is associated with the topic (e.g., a category or a type that the machine-learning model has associated with the object) and outputs the probability/probabilities. In various embodiments, the machine-learning model may make a prediction that an object detected within an image corresponds to a specific item (e.g., a product), in which the item corresponds to the topic. In such embodiments, the machine-learning model may compare the object to images of items (e.g., images of products included in a product catalog) and make one or more predictions that each correspond to a probability that an object detected within the image is associated with the topic based on the comparison.

In embodiments in which the machine-learning model predicts a probability that an object detected within an image included in a content item is associated with the topic, the machine-learning model may be trained based on a training set of images including images of different objects associated with different topics. In some embodiments, the training set of images may include publicly available information identifying different topics associated with different objects. The machine-learning model also may be trained based on attributes that characterize each of the training set of images (e.g., shapes, edges, curves, etc.) as well as information identifying topics associated with each of the training set of images.

In embodiments in which the machine-learning model predicts a probability that an object detected within an image corresponds to a specific item, the machine-learning model may be trained based on comparisons of objects detected within images to images of items. In some embodiments, the machine-learning model is trained to predict a probability that an object detected within an image matches an item based on prior matching of objects detected within images to different items (e.g., images of different products included in one or more product catalogs). For example, when training the machine-learning model, the online system 140 (or a third-party system 130) applies a label to an object detected within an image indicating that the object matches an item (e.g., a product) based on attributes of the object (e.g., logos, trademarks, emblems, icons, patterns, textures, prints, etc.). From the labeled attributes of objects extracted from images, the machine-learning model is trained using any suitable training method or combination of training methods (e.g., back propagation if the machine-learning model is a neural network, curve fitting techniques if the machine-learning model is a linear regression model, etc.).

The online system 140 then applies 315 (e.g., using the prediction module 240) the machine-learning model to predict a probability that each content item retrieved 305 by the online system 140 is associated with the topic. To apply 315 the machine-learning model to predict a probability that a content item retrieved 305 by the online system 140 is associated with the topic, the online system 140 provides as input to the machine-learning model that includes the content of the content item. As described above, the content of a content item may include various types of structured and/or unstructured data (e.g., text data, image data, video data, audio data, etc.) included in one or more components of the content item (e.g., a caption, one or more images, one or more videos, one or more tags, a set of targeting criteria specifying an audience for the content item, a location, one or more audio files, etc.). Based on the content of the content item, the machine-learning model predicts a probability that the content item is associated with the topic. The online system 140 then receives an output from the machine-learning model corresponding to the predicted probability. In embodiments in which the online system 140 retrieves multiple machine-learning models that collectively perform the function of the machine-learning model, the online system 140 may apply the machine-learning models in an analogous manner.

The online system 140 identifies 320 (e.g., using the performance determination module 245) one or more content items, each of which is associated with a probability predicted by the machine-learning model that is at least a threshold probability. In some embodiments, the online system 140 may do so by comparing a predicted probability associated with a content item to the threshold probability and then determining whether the predicted probability is at least the threshold probability based on the comparison. For example, suppose that the online system 140 has applied 315 the machine-learning model to predict probabilities that the content items retrieved 305 by the online system 140 are associated with the topic. In this example, the online system 140 may compare a probability associated with each content item predicted by the machine-learning model to a threshold probability. In this example, if the probability is at least a threshold probability, the content item is identified 320 by the online system 140. In the above example, if the probability is less than the threshold probability, the content item is not identified 320 by the online system 140.

In some embodiments, rather than accessing 310 and applying 315 the machine-learning model and then identifying 320 one or more content items associated with at least the threshold probability, the online system 140 may determine (e.g., using the topic extraction engine 230) one or more topics associated with each of the content items retrieved 305 by the online system 140 and identify one or more content items associated with the topic. For example, the online system 140 may determine one or more topics associated with each of the retrieved content items by identifying anchor terms included in the content item and then determining a meaning of each anchor term. In this example, each topic associated with a content item may then be stored in association with the content item (e.g., in the content store 210). Continuing with this example, the online system 140 may identify each content item that is stored in association with the topic.

The online system 140 then retrieves 325 (e.g., using the performance determination module 245) information describing user engagement with the content item(s) identified 320 by the online system 140 (e.g., from the action log 220 and/or the edge store 225). Examples of types of user engagement with a content item may include viewing the content item, sharing the content item, saving the content item, expressing a preference for the content item, commenting on the content item, reporting the content item as inappropriate, interacting with the content item to unsubscribe to content created by an online system user who created the content item, etc. For example, the online system 140 may retrieve 325 information from the action log 220 and/or the edge store 225 describing a number of times that each content item identified 320 by the online system 140 was viewed, a number of times that each content item was shared, a number of times that each content item was saved, a number of times that one or more users of the online system 140 expressed a preference for each content item, a number of comments on each content item, a time at which each user engaged with each content item, etc. Alternatively, in the above example, the online system 140 may retrieve 325 information from the action log 220 and/or the edge store 225 describing each instance that a type of user engagement with each content item identified 320 by the online system 140 occurred, which may then be tabulated to determine a number of times that the type of user engagement with each content item occurred. In some embodiments, information describing user engagement with each content item identified 320 by the online system 140 retrieved 325 by the online system 140 also may include various types of information associated with each user who engaged with the content item. For example, the online system 140 may retrieve 325 information identifying each user who engaged with each content item identified 320 by the online system 140, information describing a type of client device 110 associated with the user, etc.

The online system 140 then determines 330 (e.g., using the performance determination module 245) a value of a performance metric for the topic based on the retrieved information describing user engagement with the content item(s). Examples of performance metrics include a click-through-rate (CTR), a conversion rate, or any other suitable type of performance metric describing user engagement with the content item(s). In embodiments in which the online system 140 determines 330 the value of the performance metric for the topic based on information describing user engagement with multiple content items, the online system 140 may determine a value of a performance metric for each content item and determine the value of the performance metric for the topic based on the values of the performance metrics for all of the content items. For example, the online system 140 may determine a value of a click-through-rate for the topic to be an average of the click-through-rates for multiple content items identified 320 by the online system 140.

Once the online system 140 has determined 330 the value of the performance metric for the topic, the online system 140 may determine whether the value is at least a threshold value. The online system 140 may do so by comparing the value of the performance metric for the topic to the threshold value and then determining whether the value of the performance metric for the topic is at least the threshold value based on the comparison. For example, suppose that the online system 140 has determined 330 the value of the performance metric for the topic to be 3.5%, in which the value of the performance metric for the topic corresponds to an average of the landing page conversion rates for multiple content items. In this example, if the threshold value corresponds to a value of 3.2%, the online system 140 determines 335 that the value of the performance metric for the topic is at least the threshold value since 3.5% is equal to or greater than 3.2%.

In some embodiments, the online system 140 may determine (e.g., using the performance determination module 245) whether the value of the performance metric for the topic is an anomaly. In such embodiments, the online system 140 may make the determination for a particular time period (e.g., a current time period). For example, the online system 140 may compare the value of the performance metric for the topic for a current time period to values of the performance metric for the topic for previous time periods. In this example, the online system 140 may determine that the value of the performance metric for the topic for the current time period is an anomaly if the value is greater than the values of the performance metric for the topic for the previous time periods by at least a threshold amount. Alternatively, in the above example, the online system 140 may determine that the value of the performance metric for the topic for the current time period is not an anomaly if the value is not greater than the values of the performance metric for the topic for the previous time periods by at least the threshold amount. The online system 140 may determine whether the value of the performance metric for the topic is an anomaly using any anomaly detection technique (e.g., density-based techniques such as k-nearest neighbor, one-class support vector machines, etc.).

In some embodiments, the online system 140 may determine (e.g., using the audience determination module 250) a set of targeting criteria associated with the topic. The online system 140 may do so by retrieving various attributes associated with one or more users of the online system 140 who engaged with each content item identified 320 by the online system 140. The online system 140 may then determine a set of targeting criteria associated with the topic based on the retrieved information. For example, the online system 140 may retrieve information from the user profile store 205 describing demographic information associated with each user who engaged with each content item identified 320 by the online system 140 (e.g., an age and a geographic location associated with each user), information describing hobbies and occupations of each user, etc. In this example, the online system 140 also may retrieve information from the action log 220 and/or the edge store 225 describing interactions by each user who engaged with each content item identified 320 by the online system 140 (e.g., interactions with other users of the online system 140 or objects maintained in the online system 140). In the above example, based on the retrieved information, the online system 140 may determine a set of targeting criteria associated with the topic, in which the targeting criteria are satisfied by users of the online system 140 who are likely to have an affinity for the topic. In some embodiments, the online system 140 may determine a set of targeting criteria associated with the topic if the online system 140 determines 335 that the value of the performance metric for the topic is at least a threshold value. Alternatively, in some embodiments, the online system 140 may do so if the online system 140 determines that the value of the performance metric is an anomaly (e.g., for a current time period).

The online system 140 receives 340 content describing an item from an entity having a presence on the online system 140, in which the item is associated with the topic. In some embodiments, the content describing the item received 340 from the entity is a catalog of products associated with the entity. In such embodiments, the catalog of products may include various types of information associated with each product, such as a product identifier, one or more images of the product, a name of the product, a price at which the entity offers the product for purchase, a description of the product, etc. In some embodiments, the online system 140 may store the content received 340 from the entity (e.g., in the content store in association with information identifying the entity). In various embodiments, the online system 140 may receive information from the entity describing the item and/or the topic. In various embodiments, the online system 140 may determine that the content received 340 from the entity describes the item and/or that the item is associated with the topic. In such embodiments, the online system 140 may do so using one of the methods described above (e.g., by providing the content as an input to the machine-learning model, by determining the topic associated with the content based on one or more anchor terms included in the content, etc.).

If the online system 140 determines 335 that the value of the performance metric for the topic is at least the threshold value (or determines that the value of the performance metric for the topic is an anomaly), the online system 140 determines 345 an opportunity to communicate a recommendation to the entity to create a content item describing the item. For example, suppose that the online system 140 received 340 a catalog of tennis products describing an item corresponding to a tennis racket from the entity, in which the item is associated with the topic of tennis. In this example, the online system 140 may determine 345 an opportunity to communicate a recommendation to the entity to create a content item describing the tennis racket upon receiving a request to log into a user account associated with the entity. In some embodiments, the recommendation also or alternatively may include an option to add one or more components (e.g., a tag associated with the item) to the content item. In embodiments in which the recommendation only includes an option to add one or more components to the content item, the online system 140 may determine an opportunity to communicate the recommendation to the entity upon receiving a request from the entity to create the content item. For example, suppose that the online system 140 receives a request from the entity to create a content item describing an item associated with the topic. In this example, the online system 140 may determine an opportunity to communicate a recommendation to the entity to add one or more images of the item to the content item upon receiving the request.

Once the online system 140 has determined 345 an opportunity to communicate the recommendation to the entity, the online system 140 may generate (e.g., using the user interface generator 255) the recommendation. In some embodiments, the recommendation may be included in a composer interface generated by the online system 140, while in other embodiments, the recommendation may be included in a window (e.g., a pop-up window) or other type of user interface generated by the online system 140. As described above, in some embodiments, the recommendation may include one or more options to add one or more components (e.g., a tag associated with the item) to the content item. Examples of components that may be added to the content item include one or more tags, a caption, one or more videos, one or more images, a set of targeting criteria specifying an audience for the content item, a location, one or more audio files, or any other suitable types of components. In embodiments in which the recommendation includes one or more options to add one or more components to the content item, the recommendation also may include pre-populated information corresponding to the component(s).

Figure 4:
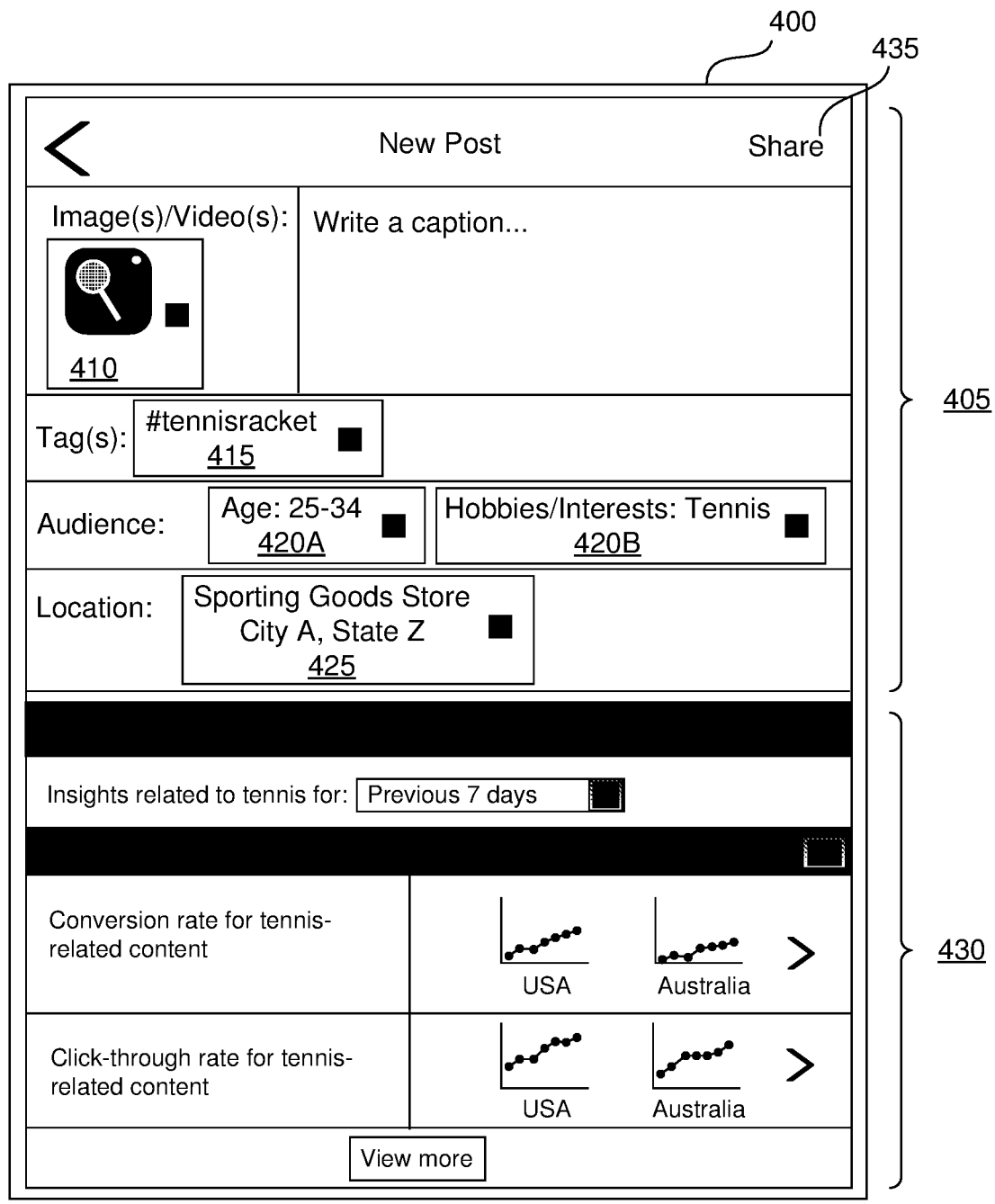
FIG. 4 is an example of a user interface that includes a recommendation to create a content item describing an item and to add various components to the content item, in accordance with an embodiment.

Referring now to FIG. 4, suppose that the topic corresponds to tennis and that the item corresponds to a tennis racket, such that the online system 140 has generated a recommendation 405 to the entity to create a content item describing the tennis racket. In this example, suppose also that the recommendation 405 is included in a composer interface 400 and that the recommendation 405 includes options to add various components to the content item. In this example, the recommendation 405 may be pre-populated with an image 410 of the tennis racket (e.g., retrieved from a catalog of products received 340 from the entity), a tag 415 (i.e., "#tennisracket") associated with the item, targeting criteria 420A-B specifying an audience for the content item (i.e., users between the ages of 25 and 34 who have hobbies/interests including tennis), and a location 425 of the entity (i.e., "Sporting Goods Store" in "City A, State Z").

In some embodiments, the online system 140 also may generate a user interface (e.g., a window) including the value of the performance metric for the topic. In embodiments in which the recommendation is included in a composer interface generated by the online system 140, the value of the performance metric for the topic may be included in the composer interface as well. The value of the performance metric for the topic may be expressed in various ways (e.g., via text, graphically, etc.). As shown in the example of FIG. 4, suppose that the value of the performance metric for the topic corresponds to a conversion rate for tennis-related content. In this example, the composer interface 400 including the recommendation 405 may include an area 430 that displays the value of the performance metric for the topic using multiple graphs indicating conversion rates for tennis-related content by users of the online system 140 who were presented with content items associated with the topic of tennis over a period of time (e.g., the previous seven days) for various geographic locations (e.g., U.S.A., Australia, etc.).

In some embodiments, the user interface or composer interface may include multiple values of one or more performance metrics for one or more topics. As shown in the example of FIG. 4, if an additional value of a performance metric for the topic corresponds to a click-through-rate for tennis-related content, the area 430 of the composer interface 400 also may include multiple graphs indicating click-through-rates for tennis-related content by users of the online system 140 who were presented with content items associated with the topic of tennis over a period of time (e.g., the previous seven days) for various geographic locations (e.g., U.S.A., Australia, etc.). In some embodiments, the user interface or composer interface also may include one or more interactive elements (e.g., drop-down menus, buttons, etc.). In the example of FIG. 4, interactive elements included in the composer interface 400 may allow additional graphs to be viewed (e.g., graphs corresponding to values of additional performance metrics for the topic, graphs corresponding to the values of the performance metrics for different periods of time, for different geographic locations, for different demographics, etc.).

Referring back to FIG. 3, the online system 140 then communicates 350 the recommendation to the entity. For example, the online system 140 may communicate 350 the recommendation to the entity via a client device 110 associated with the entity. In embodiments in which the online system 140 generates a user interface including the value of the performance metric for the topic that is separate from the user interface including the recommendation, the value of the performance metric for the topic may be communicated to the entity in conjunction with the recommendation.

The online system 140 subsequently may receive a request from the entity to create the content item and the online system 140 may then generate (e.g., using the user interface generator 255) the content item based on the request. In some embodiments, the content item may include pre-populated information corresponding to one or more components of the content item that have been accepted by the entity. In embodiments in which the recommendation includes pre-populated information corresponding to one or more components of a content item, the pre-populated information may be accepted or rejected. In the example of FIG. 4, the online system 140 may receive the request to create the content item from the entity upon receiving an interaction with an interactive element 435 of the composer interface 400. In this example, if the composer interface 400 includes the pre-populated information for the components (i.e., the image 410, the tag, 415, the targeting criteria 420A-B that specify the audience for the content item, and the location 425) at the time that the online system 140 receives the request, the pre-populated information is accepted and the content item may be created based on the request. Alternatively, in the above example, if some or all of the pre-populated information is removed from the composer interface at the time that the online system 140 receives the request, the pre-populated information that has been removed is rejected and the content item may be created based on the request. In various embodiments, the content item also or alternatively may include information corresponding to one or more components of the content item that have been provided by the entity. In the above example, the content item may include a caption added by the entity as well as one or more additional images, tags, and targeting criteria.

The online system 140 subsequently may send the content item for display to one or more viewing users of the online system 140. For example, upon determining an opportunity to present content to a viewing user of the online system 140, the online system 140 may identify (e.g., using the content selection module 260) a set of candidate content items eligible for presentation to the viewing user based on the targeting criteria associated with the content item. If the content item is included among the set of candidate content items, the online system 140 may rank (e.g., using the content selection module 260) the content item among the set of candidate content items based on the targeting criteria associated with the content item and targeting criteria associated with each additional content item included among the set of candidate content items. The online system 140 then selects (e.g., using the content selection module 260) one or more content items from the set of candidate content items for presentation to the viewing user based on the ranking and sends the selected content item(s) for presentation to the viewing user.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
retrieving a plurality of content items maintained in an online system;
accessing a trained machine-learning model, the trained machine-learning model trained based at least in part on a topic associated with each of a set of content items and content comprising each of the set of content items;
applying the trained machine-learning model to predict a probability that each of the plurality of content items is associated with the topic, the probability predicted based at least in part on content comprising each of the plurality of content items;
identifying one or more content items of the plurality of content items associated with at least a threshold probability;
retrieving information describing user engagement with the identified one or more content items by one or more users of the online system;
determining a value of a performance metric for the topic based at least in part on the retrieved information;
determining that the value of the performance metric is at least a threshold value;

receiving content describing an item from an entity having a presence on the online system, wherein the content comprises a catalog of products associated with the entity;

determining an item in the catalog of products that is associated with the topic having the value of the performance metric at least a threshold value;

generating a user interface including a recommendation to the entity to create a new content item to the online system for viewing by other users of the online system, where the recommendation describes the item and to includes a tag associated with the item, and is pre-populated with one or more images of the item from the catalog of products; and communicating the recommendation to the entity.

2. The method of claim 1, further comprising:
retrieving a set of attributes associated with each of the one or more users; and
determining a set of targeting criteria associated with the topic based at least in part on the set of attributes associated with each of the one or more users.

3. The method of claim 2, wherein the recommendation further comprises an option to specify an audience for the content item, wherein the audience for the content item corresponds to the targeting criteria associated with the topic.

4. The method of claim 3, further comprising:
receiving a request from the entity to create the content item describing the item, wherein the request specifies that the audience for the content item corresponds to the targeting criteria associated with the topic;
generating the content item describing the item based at least in part on the request;
determining an opportunity to present content to a viewing user of the online system;
identifying a set of candidate content items eligible for presentation to the viewing user based at least in part on the targeting criteria, wherein the content item is included among the set of candidate content items;
ranking the content item among the set of candidate content items based at least in part on the targeting criteria;
selecting one or more content items from the set of candidate content items for presentation to the viewing user based at least in part on the ranking; and
sending the selected one or more content items for presentation to the viewing user.

5. The method of claim 1, wherein the tag is pre-populated with information describing the item.

6. The method of claim 1, wherein the information describing user engagement with the identified one or more content items by the one or more users of the online system comprises one or more selected from the group consisting of: a number of times that each of the identified one or more content items was viewed, a number of times that each of the identified one or more content items was shared, a number of times that each of the identified one or more content items was saved, a number of times that the one or more users of the online system expressed a preference for each of the identified one or more content items, and a number of comments on each of the identified one or more content items.

7. The method of claim 1, wherein the recommendation is communicated to the entity in conjunction with the value of the performance metric for the topic.

8. The method of claim 1, wherein the probability that each of the plurality of content items is associated with the topic is predicted based at least in part on one or more selected from the group consisting of: a tag comprising one or more of the plurality of content items, an image comprising one or more of the plurality of content items, and a video comprising one or more of the plurality of content items.

9. The method of claim 1, wherein the user interface further includes an interactive element, and the method further comprising:
responsive to receiving an interaction with the interactive element indicating acceptance of the recommendation, generating the new content item based on the recommendation; and
determining an opportunity to present content to a viewing user of the online system.

10. A computer program product comprising a computer readable storage medium having instructions encoded thereon that, when executed by a processor, cause the processor to:
retrieve a plurality of content items maintained in an online system;
access a trained machine-learning model, the trained machine-learning model trained based at least in part on a topic associated with each of a set of content items and content comprising each of the set of content items;
apply the trained machine-learning model to predict a probability that each of the plurality of content items is associated with the topic, the probability predicted based at least in part on content comprising each of the plurality of content items;
identify one or more content items of the plurality of content items associated with at least a threshold probability;
retrieve information describing user engagement with the identified one or more content items by one or more users of the online system;
determine a value of a performance metric for the topic based at least in part on the retrieved information;
determine that the value of the performance metric is at least a threshold value;
receive content describing an item from an entity having a presence on the online system, wherein the content comprises a catalog of products associated with the entity;
determining an item in the catalog of products that is associated with the topic having the value of the performance metric at least a threshold value;
generating a user interface including a recommendation to the entity to create a new content item to the online system for viewing by other users of the online system, where the recommendation describes the item and to includes a tag associated with the item, and is pre-populated with one or more images of the item from the catalog of products; and
communicate the recommendation to the entity.

11. The computer program product of claim 10, wherein the computer-readable storage medium further has instructions encoded thereon that, when executed by the processor, cause the processor to:
retrieve a set of attributes associated with each of the one or more users; and
determine a set of targeting criteria associated with the topic based at least in part on the set of attributes associated with each of the one or more users.

12. The computer program product of claim 11, wherein the recommendation further comprises an option to specify an audience for the content item, wherein the audience for the content item corresponds to the targeting criteria associated with the topic.

13. The computer program product of claim 12, wherein the computer-readable storage medium further has instructions encoded thereon that, when executed by the processor, cause the processor to:
receive a request from the entity to create the content item describing the item, wherein the request specifies that the audience for the content item corresponds to the targeting criteria associated with the topic;
generate the content item describing the item based at least in part on the request;
determine an opportunity to present content to a viewing user of the online system;
identify a set of candidate content items eligible for presentation to the viewing user based at least in part on the targeting criteria, wherein the content item is included among the set of candidate content items;
rank the content item among the set of candidate content items based at least in part on the targeting criteria;
select one or more content items from the set of candidate content items for presentation to the viewing user based at least in part on the ranking; and
send the selected one or more content items for presentation to the viewing user.

14. The computer program product of claim 10, wherein the tag is pre-populated with information describing a product comprising the catalog of products associated with the entity.

15. The computer program product of claim 10, wherein the information describing user engagement with the identified one or more content items by the one or more users of the online system comprises one or more selected from the group consisting of: a number of times that each of the identified one or more content items was viewed, a number of times that each of the identified one or more content items was shared, a number of times that each of the identified one or more content items was saved, a number of times that the one or more users of the online system expressed a preference for each of the identified one or more content items, and a number of comments on each of the identified one or more content items.

16. The computer program product of claim 10, wherein the recommendation is communicated to the entity in conjunction with the value of the performance metric for the topic.

17. The computer program product of claim 10, wherein the probability that each of the plurality of content items is associated with the topic is predicted based at least in part on one or more selected from the group consisting of: a tag comprising one or more of the plurality of content items, an image comprising one or more of the plurality of content items, and a video comprising one or more of the plurality of content items.

18. The computer program product of claim 10, wherein the user interface further includes an interactive element, and the instructions further cause the processor to:
responsive to receiving an interaction with the interactive element indicating acceptance of the recommendation, generate the new content item based on the recommendation; and
determine an opportunity to present content to a viewing user of the online system.

* * * * *